US009738501B2

(12) United States Patent
Wendt et al.

(10) Patent No.: US 9,738,501 B2
(45) Date of Patent: Aug. 22, 2017

(54) INDUSTRIAL TRUCK WITH RAMP LIFT FUNCTION

(71) Applicant: Jungheinrich Aktiengesellschaft, Hamburg (DE)

(72) Inventors: Dirk Wendt, Luneburg (DE); Klaus-Peter Badura, Barum (DE)

(73) Assignee: Jungheinrich Aktiengesellschadt, Hamburg (DE)

( * ) Notice: Subject to any disclaimer, the term of this patent is extended or adjusted under 35 U.S.C. 154(b) by 77 days.

(21) Appl. No.: 14/717,507

(22) Filed: May 20, 2015

(65) Prior Publication Data

US 2015/0336781 A1    Nov. 26, 2015

(30) Foreign Application Priority Data

May 20, 2014   (DE) .......................... 10 2014 107 082

(51) Int. Cl.
*B62B 3/06* (2006.01)
*B66F 9/22* (2006.01)
*B66F 9/065* (2006.01)
*F15B 1/04* (2006.01)
*F15B 13/02* (2006.01)

(52) U.S. Cl.
CPC .............. *B66F 9/22* (2013.01); *B62B 3/0618* (2013.01); *B66F 9/065* (2013.01); *F15B 1/04* (2013.01); *F15B 13/02* (2013.01); *B62B 2203/26* (2013.01); *F15B 2201/00* (2013.01)

(58) Field of Classification Search
USPC ....................................................... 254/2 R
See application file for complete search history.

(56) References Cited

U.S. PATENT DOCUMENTS

| 7,040,427 B2 * | 5/2006 | Toomey ................ | B62B 3/0612 180/19.2 |
| 8,540,213 B2 * | 9/2013 | Feiquan .................. | B66F 9/065 254/2 C |
| 2003/0213651 A1 * | 11/2003 | Lohmann .............. | B62B 3/0618 187/231 |
| 2005/0116432 A1 * | 6/2005 | Borrmann ................. | B62B 3/02 280/43.12 |

(Continued)

FOREIGN PATENT DOCUMENTS

| DE | 1945312 | 9/1966 |
| DE | 3614986 | 5/1986 |
| DE | 3710776 | 3/1987 |

(Continued)

*Primary Examiner* — Larry E Waggle, Jr.
*Assistant Examiner* — Alvin Grant
(74) *Attorney, Agent, or Firm* — Barclay Damon, LLP

(57) ABSTRACT

Industrial truck with a drive part and a load part with two wheel arms that is height-adjustable relative to the drive part, wherein each of the wheel arms has a wheel arm lever, which has at least one load roller and is pivotably articulated on the wheel arm, and a rod, via which a height adjusting movement of the load part is coupled with a pivoting movement of the wheel arm lever, wherein the rod has a hydraulic cylinder, with which a length of the rod is adjustable and which has an operating volume, characterized in that the two rods are push rods, and the industrial truck has a pressure accumulator, which is connectable with the operating volumes of the two hydraulic cylinders.

20 Claims, 5 Drawing Sheets

(56) References Cited

U.S. PATENT DOCUMENTS

2014/0166951 A1\* 6/2014 Mariotti ............... B62B 3/0631
  254/2 R
2014/0175350 A1\* 6/2014 Mariotti ............... B62B 3/0631
  254/2 R

FOREIGN PATENT DOCUMENTS

| DE | 4136820 | 11/1991 |
| DE | 9205223 | 4/1992 |

\* cited by examiner

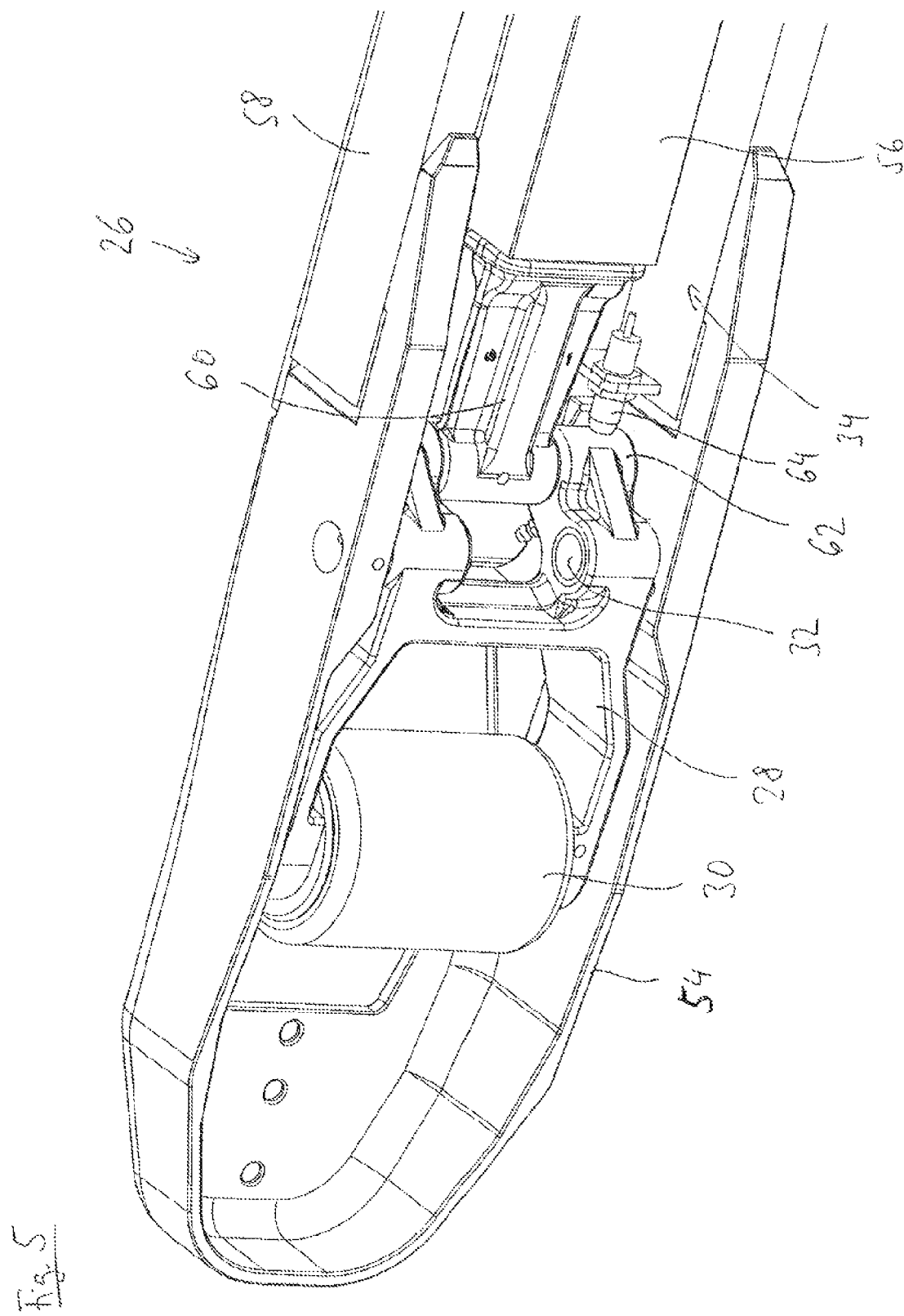

INDUSTRIAL TRUCK WITH RAMP LIFT FUNCTION

CROSS REFERENCE TO RELATED APPLICATION

This application is based upon and claims priority to German Patent Application No. 10 2014 107 082.8, filed May 20, 2014, under relevant sections of 35 USC §119, the entire contents of which are hereby incorporated by reference.

BACKGROUND OF THE INVENTION

The invention relates to an industrial truck with a drive part and a load part with two wheel arms that is height-adjustable relative to the drive part. Each of the wheel arms has a pivotably articulated wheel arm lever with at least one load roller and a rod, via which a height adjusting movement of the load part is coupled with a pivoting movement of the wheel arm lever. The rod has a hydraulic cylinder with which a length of the rod is adjustable. In order to realize a ramp lift function, the load part can thereby be raised with respect to the drive part without simultaneously swinging out the wheel arm lever. The wheel arm tips can thus remain in their lowered position. Such a ramp lift is useful in particular for negotiating ramps, but possibly also for lifting loads that are not arranged parallel to the ground, for example in the case of greater ground unevennesses under a rack bin location.

An industrial truck with ramp lift function became known from publication DE 37 10 776 A1. In the case of the known truck, a pull rod is articulated to the wheel arm lever, which must be pulled in order to swing out the wheel arm lever. This takes place with the help of a deflection lever, the middle section of which is rotatably mounted on the load part. One end of the deflection lever is articulated on the drive part so that, during the lifting of the load part, the other end, which is connected with the push rod, is deflected.

Based on this background, the object of the invention is to provide an industrial truck with ramp lift function, in which a push rod is used instead of the pull rod, as well as a retrofit kit, with which a conventional industrial truck with a push rod can be retrofitted so that it has a ramp lift function.

This object is solved by the industrial truck with the characteristics of claim 1. Advantageous embodiments are specified in the subsequent sub-claims.

BRIEF SUMMARY OF THE INVENTION

The industrial truck has a drive part and a load part with two wheel arms that is height-adjustable relative to the drive part, wherein each of the wheel arms has the following: (i) a wheel arm lever, which has at least one load roller and is pivotably articulated on the wheel arm, and (ii) a rod, via which a height adjusting movement of the load part is coupled with a pivoting movement of the wheel arm lever, wherein the rod has a hydraulic cylinder, with which a length of the rod is adjustable and which has an operating volume, wherein the two rods are push rods and the industrial truck has a pressure accumulator, which is connectable with the operating volumes of the two hydraulic cylinders.

The industrial truck can be a low-lift or high-lift truck. It can be a drawbar-guided industrial truck, in particular a pallet truck or a ride-along truck. The industrial truck can have an electric traction drive and/or a lift drive driven by an electric pump aggregate. By lifting the drive part relative to the load part and simultaneously swinging out the wheel arm lever with the at least one load roller, the industrial truck can execute a so-called initial lift, in which a load-bearing means, which can be formed for example by the wheel arms themselves or by the fork arms arranged above the wheel arms, is lifted in a horizontal arrangement. The drive part can have at least one steerable wheel.

A design of such industrial trucks known for example from the publication DE 10 2009 033 709 A1 uses a push rod for swinging out the wheel arm lever. In order to be able to execute a ramp lift function in the initially described manner, the length of the push rod must be adjustable. For the initial lift function, the push rods must transfer great forces for swinging out the wheel arms in particular when the industrial truck is loaded. If the length adjustability of the push rods needs to be executed by means of hydraulic cylinders, as shown in the initially cited publication DE 37 10 776 A1 in connection with a pull rod, the hydraulic system of the industrial truck would need to provide a considerably high pressure for each initial lift.

Another problem with the use of push rods is that the push rods have their shortest length in the ramp lift position, i.e. when the integrated hydraulic cylinders are located in a retracted position. When the load part is lowered from the ramp lift position, the operating volumes of the lift cylinders must be filled again very quickly although the hydraulic system during the lowering is generally depressurized or respectively the pump aggregate is switched off.

In the invention, these difficulties are overcome in that the industrial truck has a pressure accumulator, which is connectable with the operating volumes of the two hydraulic cylinders. It is thereby provided to connect the pressure accumulator and operating volumes in particular when a change is made from an initial lift function to a ramp lift function. During the "normal" initial lift, the push rods have their greatest length and the integrated hydraulic cylinders are in an extended position. The operating volumes of the hydraulic cylinders are filled accordingly with hydraulic fluid and the hydraulic fluid located in them is confined in order to be able to transfer the required pressures.

In order to execute the ramp lift function, the length of the push rods must be changeable. For this, in the case of the invention, the connection between the operating volumes of the two hydraulic cylinders and the pressure accumulator is established and the hydraulic fluid previously confined in the hydraulic cylinders can flow out of the operating volumes of the hydraulic cylinders into the pressure accumulator during the lifting process. The connection can subsequently be optionally blocked. During the lowering process, the connection between the operating volumes and the pressure accumulator is re-established and the hydraulic fluid flows back into the operating volumes so that the hydraulic cylinders can extend until the push rods again have their greatest length.

The pressure accumulator can be for example a membrane, bladder or piston accumulator. It can receive the hydraulic fluid located in the two operating volumes and thereby maintain the pressure required for the quick and reliable return of the hydraulic liquid into the operating volumes.

In particular, a control valve can be used to be able to establish the connection between the two operating volumes and the pressure accumulator. The connection is established in a through position of the control valve. Additionally, the control valve can have a locked position, in which the connection between the operating volumes and the pressure accumulator is blocked.

In one embodiment, the industrial truck has a hydraulic system with a lift cylinder and a hydraulic pump that is completely separated hydraulically from the pressure accumulator and the hydraulic cylinders of the push rods. The lift cylinder serves to lift the load part relative to the drive part. The hydraulic pump can have an electric pump aggregate. In the invention, the hydraulic system of the industrial truck is completely separated hydraulically from the pressure accumulator and the hydraulic cylinders of the push rods; i.e. there is no exchange of hydraulic fluid. The pressure accumulator and the hydraulic cylinders of the push rods form an independent hydraulic system. Since it has no pump, it can also be called a passive hydraulic system. The complete separation of the two hydraulic systems has the advantage that both can be independently functional. A further advantage is that existing industrial trucks can be retrofitted relatively simply with a passive hydraulic system according to the invention.

In one embodiment, a control valve is assigned to each of the two operating volumes, with which the respective operating volume can be optionally blocked or connected with the pressure accumulator. The two control valves can be in particular load holding valves, which are leak-free in the blocked position. In this embodiment, both operating volumes can be blocked separately. A lateral inclination of the load-bearing means or even tipping can hereby be reliably prevented even in the case of uneven loading of the two wheel arms.

In one embodiment, a flow-control valve and a bypass valve connected in parallel to the flow-control valve are connected between the two control valves on the one hand and the pressure accumulator on the other hand, such that the connection between the two operating volumes and the pressure accumulator can be made selectively via the flow-control valve or via the bypass valve. Generally, switching between an initial lift (that is a height adjusting movement of the load part relative to the drive part coincident with a pivoting movement of the wheel arm levers) and a ramp lift (that is a height adjusting movement of the load part relative to the drive part without a pivoting movement of the wheel arm levers, or a pivoting movement of the wheel arm levers without a height adjusting movement of the load part relative to the drive part) can be performed by opening and closing, respectively, of the control valves. In certain operating conditions—for example, when the load part is in an elevated position and carries a load—opening of the control valves can lead to a sudden lowering of the wheel arm tips. For this reason, it can be an advantage to interconnect a flow-control valve, in particular a pressure-compensated flow-control valve, which leads to a uniform, slow lowering of the wheel arm tips. With the specific embodiment mentioned above, this can be achieved anytime. According to another embodiment, the bypass valve remains closed whenever an operating state of the industrial truck is unknown, in particular immediately after start-up of the industrial truck from a fully deactivated state. Once the operating state is known, for example after a fully lowered position of the load part has been reached, the bypass valve can be opened permanently and an electronic control can take care not to open the control valves under critical operating conditions.

In one embodiment, the industrial truck comprises a sensor adapted to indicate when a medium lift height is reached, and an electronic control adapted to open the two control valves when an actual lift height falls below the medium lift height during lowering the load part relative to the drive part while the bypass valve is closed. In particular, the sensor can be arranged such that it responds when the load part passes a medium lift height relative to the drive part. The medium lift height can be in a range of 10% to 80% of a maximum lift height, in particular in a range of 20% to 40% of a maximum lift height. When the load part is lowered from an elevated, non-horizontal position, further lowering is possible only if the push rods are further extended once the wheel arm levers have reached a fully pivoted-in position. To this end, the pressure medium can flow via the flow-control valve from the pressure accumulator into the operating volumes.

In one embodiment, an actuating element is arranged on a drawbar of the industrial truck, the actuation of which connects the pressure accumulator with the operating volumes. The actuating element can be in particular a button or switch for the electrical control of a magnetic valve. For example, a first button rocker (e.g. right) for the initial lift and a second button rocker (e.g. left) for the ramp lift can be arranged on the drawbar or respectively drawbar head. In this manner, the ramp lift function can be actuated very easily from the drawbar of the industrial truck.

In one embodiment, a sensor is present on one of the wheel arms, which captures a completely swung-in position of the associated wheel arm lever. The sensor can have for example a touch switch, a reed contact or a proximity switch. It is arranged such that the completely swung-in position of the wheel arm lever, i.e. a completely lowered wheel arm tip, can be identified. In connection with further sensors, which capture the completely raised and the completely lowered position of the load part relative to the drive part, the current state (initial lift lowered, initial lift raised, ramp lift) of the industrial truck can be determined at any time.

In one embodiment, the industrial truck has a lift cylinder, a lower end sensor, which captures a completely lowered position of the lift cylinder, a lift end sensor, which captures a completely raised position of the lift cylinder, and an electronic controller with an operating state memory, which is designed to save whether the industrial truck last executed a ramp lift or an initial lift. In this embodiment, the different functions of the industrial truck can be executed as follows: in order to execute a ramp lift, the lift cylinder must generally be moved into a more raised position, as a rule by opening a lift valve and actuating a hydraulic pump. The pressure accumulator is simultaneously connected with the operating volumes of the two hydraulic cylinders. This occurs directly after actuation of an actuating element for the ramp lift if the lower end sensor identifies that the lift cylinder is in the completely lowered position or if it is saved in the operating state memory that a ramp lift was last executed. Otherwise, the lift cylinder is then completely lowered before the ramp lift is executed. In contrast, if an initial lift is to be executed, a lift valve is also opened and a hydraulic pump is actuated. The connection between the pressure accumulator and the operating volumes of the hydraulic cylinders is simultaneously blocked. This then occurs directly after actuation of a corresponding control element if the lower end sensor identifies that the lift cylinder is in the completely lowered position or if it is saved in the operating state memory that an initial lift was last executed. Otherwise, the lift cylinder is then completely lowered, while the connection between the pressure accumulator and the operating volumes of the hydraulic cylinders is open. In the case of a lowering request by actuating a corresponding actuating element, the lift cylinder is always lowered by activating a lowering valve. If the operating state memory indicates that an initial lift was last performed, the connection between the pressure accumulator and the operating volumes remains blocked until the lower end sensor captures that the lift cylinder was lowered completely. The connection between the pressure accumulator and the operating volumes of the hydraulic cylinders can then also be opened. If the operating state memory indicates that a ramp lift was last executed, the connection between the pressure accumulator and the operating volumes is immediately opened.

In one embodiment, the industrial truck comprises a non-volatile memory in which information on an operating state of the industrial truck is maintained after the industrial truck has been switched off. The non-volatile memory can be for example a FLASH memory or any other memory that maintains its memory state independently of an energy supply. The information may say for example that at last a ramp lift was performed or that the wheel arms are arranged in a non-horizontal position. When starting-up the industrial truck, this information can be evaluated in particular in order to avoid activating a ramp lift under critical operating conditions.

In one embodiment, the hydraulic cylinders have a permissible operating pressure of 200 bar or more. In particular, the permissible operating pressure can also be 300 bar or more or 400 bar or more. Through the use of hydraulic cylinders with a high pressure resistance, the industrial truck can also be used to lift heavy loads when using hydraulic cylinders with a relatively small diameter which can be easily integrated into the wheel arms. It should be noted that the push rods must regularly transfer considerably greater forces than the weight of the load due to the geometry of the wheel arm levers and the corresponding lever actions.

The object specified above is also solved by the retrofit kit for an industrial truck with the characteristics of claim 7. Advantageous embodiments are specified in the subsequent sub-claims.

The retrofit kit is determined for an industrial truck, which has a drive part and a load part with two wheel arms that is height-adjustable relative to the drive part, wherein each of the wheel arms has a wheel arm lever, which has at least one load roller and is pivotably articulated on the wheel arm, and a push rod, via which a height adjusting movement of the load part is coupled with a pivoting movement of the wheel arm lever. The retrofit kit has the following: (i) two push rods, each of which have a hydraulic cylinder, with which a length of the push rod is adjustable and which has an operating volume, (ii) a pressure accumulator and (iii) a hydraulic connecting device, with which the operating volumes of the two hydraulic cylinders are connectable with the pressure accumulator.

For the characteristics of the retrofit kit and the industrial truck to be retrofitted, reference is made to the explanations above, which are applicable correspondingly. The industrial truck to be retrofitted can have a conventional, non-length-adjustable push rod so that only an initial lift is possible. With the help of the retrofit kit, the conventional push rods can be replaced by the two push rods each having a hydraulic cylinder. In connection with the pressure accumulator and the hydraulic connecting device, which mainly consists of a suitable arrangement of hydraulic lines and at least one control valve, the conventional industrial truck can be retrofitted into an industrial truck corresponding with the industrial truck in claim 1. The outlined retrofitting is very easy because the hydraulic system of the existing industrial truck does not need to be accessed.

In one embodiment, the hydraulic connecting device has two control valves, with which respectively one of the operating volumes can be optionally blocked or connected with the pressure accumulator. For this, reference is made to the explanations above of the corresponding characteristics of the industrial truck.

In one embodiment, the retrofit kit has an actuating element for fastening on a drawbar of the industrial truck, wherein the actuating element is designed to activate the hydraulic connecting device such that the operating volumes are connected with the pressure accumulator. In particular, it can be a button or switch, which activates a magnetic valve. Actuating elements already present on the drawbar of the industrial truck to be retrofitted do not need to be touched during the retrofitting with the actuating element for operating the ramp lift. Since many drawbars are already equipped with lift/lower button rockers on the right and left, the changeover in this case can take place via a software update, in which new functions are assigned to the existing button rockers.

In one embodiment, the hydraulic cylinders have a permissible operating pressure of 200 bar or more. For this, reference is made to the explanations above of the corresponding characteristic of the industrial truck.

BRIEF DESCRIPTION OF THE DRAWINGS

The invention is explained in greater detail below based on an exemplary embodiment shown in figures. The figures show in:

FIG. 5 is a front section of a wheel arm in a perspective view transversely from below.

DETAILED DESCRIPTION OF THE INVENTION

Figure 1:
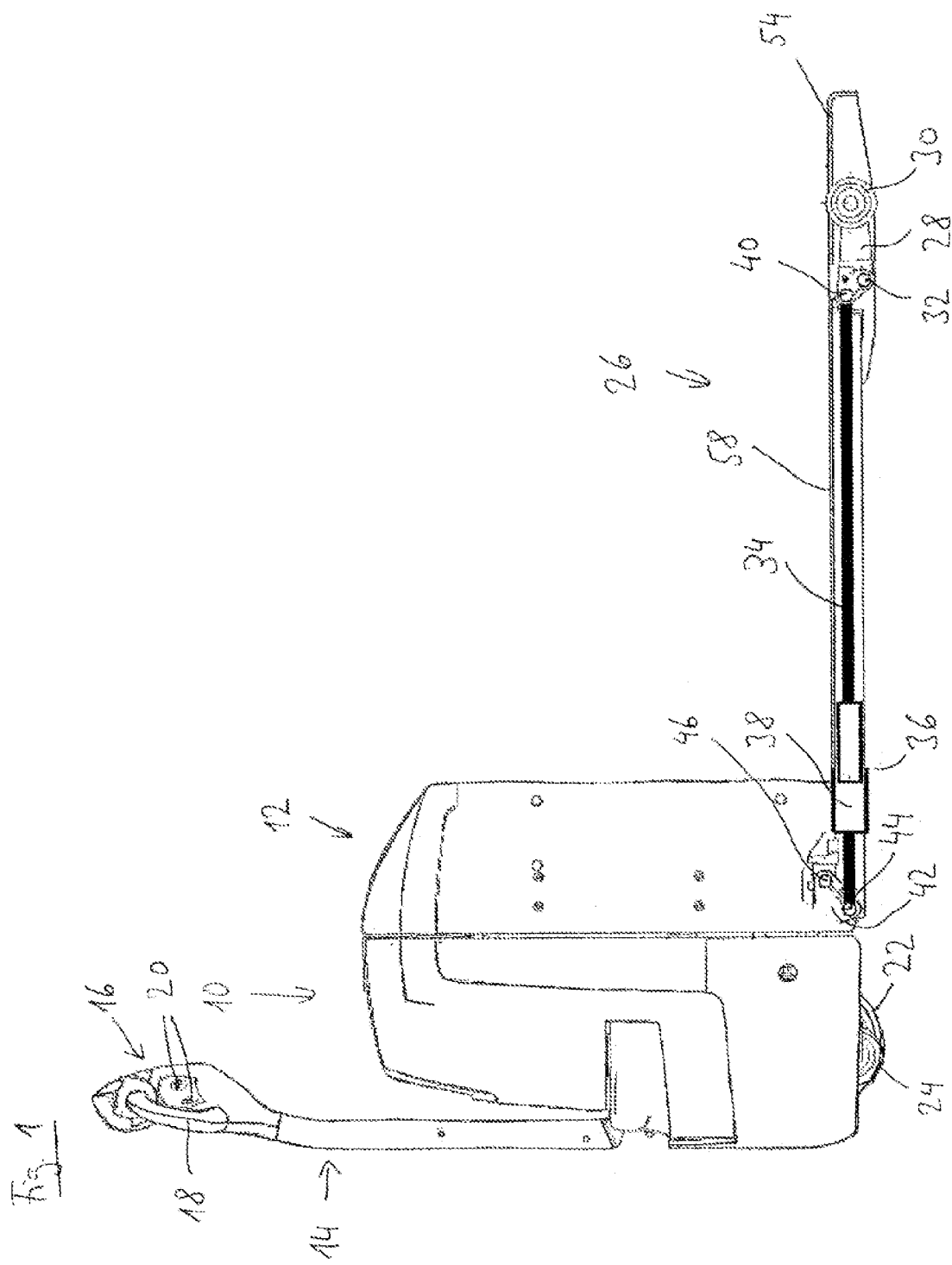
FIG. 1 is an industrial truck according to the invention in a schematic view from the side in a completely lowered position.
Figure 2:
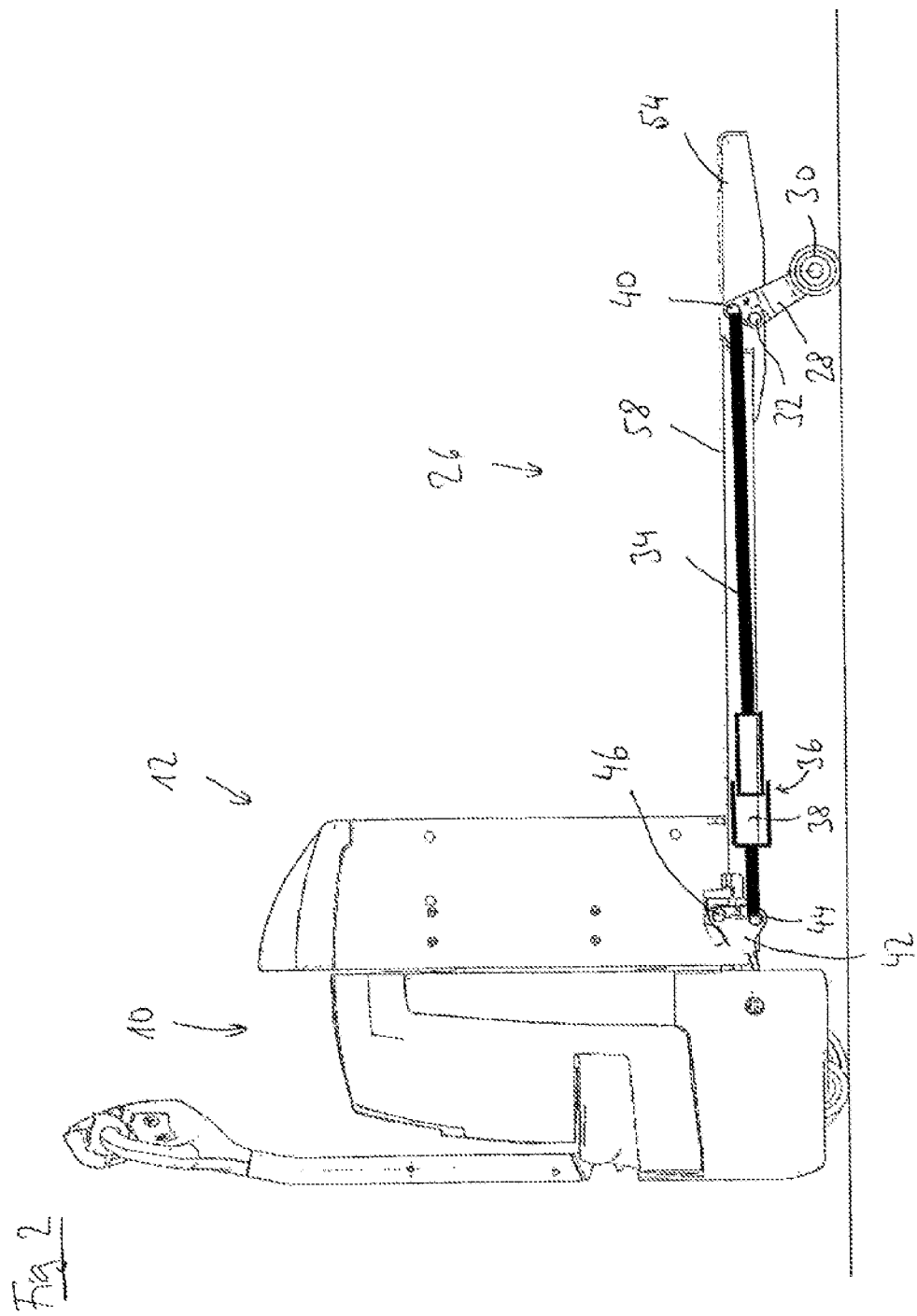
FIG. 2 is the industrial truck from FIG. 1 in a further schematic view from the side in the initial lift.
Figure 3:
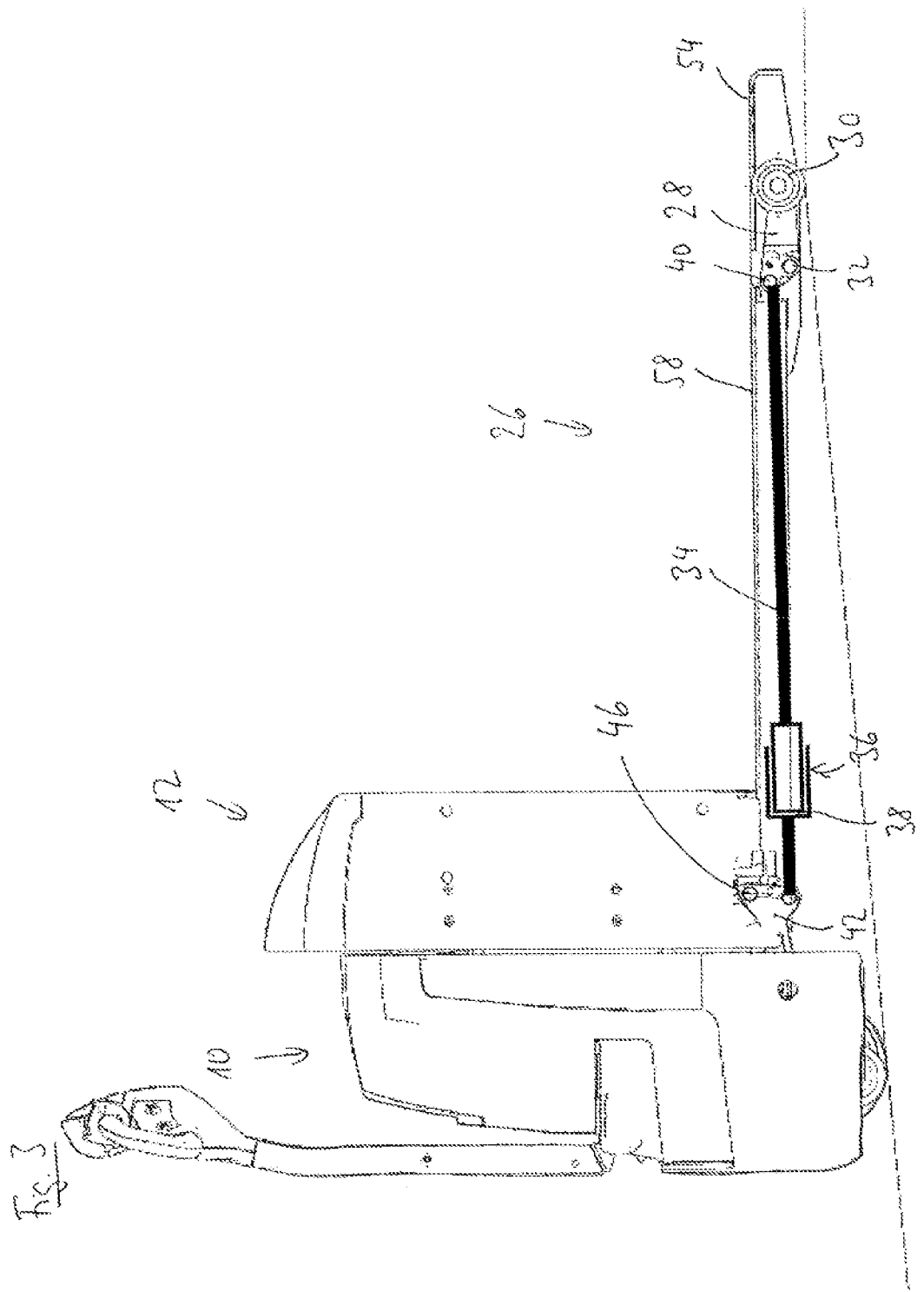
FIG. 3 is the industrial truck from FIG. 1 in a further schematic representation from the side in the ramp lift.

The industrial truck shown in entirety in FIGS. 1 to 3 is a drawbar-guided low-lift truck with a drive part 10, a load part 12 and a drawbar 14. The drawbar 14 has a drawbar head 16 with handles 18 and several actuating elements 20. The actuating elements 20 serve to control the lift drive. One of the two actuating elements 20 serves to operate a ramp lift function, which will be explained in greater detail below. The actuating elements 20 (one on right and one on left) are rockers, the actuation of which causes a lifting on one side and a lowering on the other side.

The drive part 10 has a steerable drive wheel 22 and an also steerable, non-driven wheel 24.

A lift cylinder (not shown), with which the load part 12 can be lifted relative to the drive part 10, is arranged in the load part 12. Moreover, the load part 12 has two wheel arms 26 arranged in a parallel manner, of which only the wheel arm 26 facing the observer is visible in FIGS. 1 to 3. The wheel arms 26 are permanently connected with the load part 12 and can be lifted together with it. The wheel arms have a wheel arm tip 54 and a wheel arm body 58.

A wheel arm lever 28, on the free end of which a load roller 30 is mounted, is pivotably articulated in each wheel arm 26. For this, the wheel arm lever 28 is pivotably fastened on the wheel arm 26 around an axis 32.

A push rod 34, into which a hydraulic cylinder 36 with an operating volume 38 is integrated, is located within each wheel arm 26. The front end of the push rod 34 facing the wheel arm tip 54 is hinged with the wheel arm lever 28 at 40. The other end of the push rod 34 is hinged with a deflection lever 42 (only visible in sections) at 44. A second point of the deflection lever 42 is pivotably fastened on the load part 12 around an axis 46. A further point of the deflection lever 42, which is not shown in the figures, is pivotably articulated on the drive part 10 so that the deflection lever 42 is pivoted around the axis 46 during the lifting of the load part 12 relative to the drive part 10 and the push rod 34 is displaced towards the tip of the wheel arm 26.

The arrangement shown in FIG. 2 results in the case of the completely raised load part 12. One can see that the deflection lever 42 was pivoted compared to its position in FIG. 1 and the push rod 34 overall is arranged further towards the tip of the wheel arm 26. The hydraulic cylinder 36 thereby remained in its completely extended position also shown in FIG. 1 and the hydraulic fluid located in the operating volume 38 is confined in the operating volume 38 so that the push rod 34 can transfer high pressures.

As can be seen on the right in FIG. 2, this leads to a swinging out of the wheel arm lever 28 around the axis 32 so that the wheel arm tip 54 of the wheel arm 26 is raised. FIG. 2 shows the industrial truck in the case of a fully executed initial lift. In this position, as in each intermediate position run through during the execution of the initial lift movement between the FIGS. 1 and 2, the wheel arms 26 are arranged horizontally.

In FIG. 3, the industrial truck in contrast is located in ramp lift. In this position, the load part 12 is raised completely further relative to the drive part 10, according to the position in FIG. 2. However, the hydraulic cylinder 36 of the push rod 34 is now located in a completely retracted position so that the push rod 34 has been considerably shortened and the operating volume 38 is minimal Despite the completely raised load part 12 and further correspondingly pivoted deflection lever 42, the wheel arm lever 28 is thereby located in a completely swung-in position and the wheel arm tip 54 remains lowered. As can be seen in FIG. 3, this ramp lift is particularly helpful for negotiating a ramp because the wheel arms 26 are arranged in a horizontal position.

Figure 4:
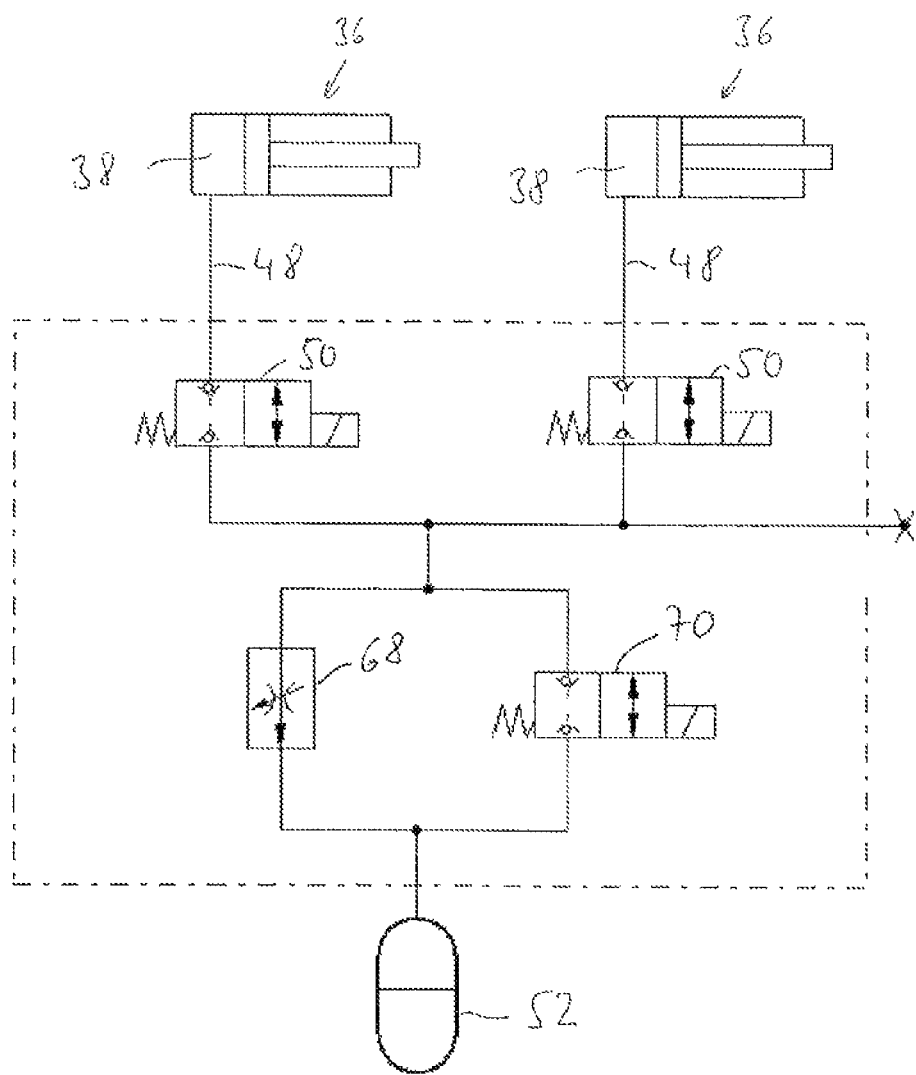
FIG. 4 is an excerpt from a hydraulic circuit diagram of the industrial truck from FIG. 1.

FIG. 4 shows the passive hydraulic system serving to adjust the push rods 34. One can see the two hydraulic cylinders 36 integrated into the push rods 34 with their operating volumes 38. FIG. 4 shows a partially extended position. Each operating volume 38 is connected with a pressure accumulator 52 via a hydraulic line 48, in which a control valve 50 is arranged, and via a valve arrangement, which consists of a flow control valve 68 and a parallel-connected bypass valve 70. In certain cases, the flow control valve 68 can prevent a sudden lowering of the fork tips. The two control valves 50, which are designed as load holding valves, are located in a locked position in FIG. 4. The hydraulic fluid located in the operating volumes 38 of the two hydraulic cylinders 36 is thereby blocked. An exchange between the two operating volumes 38 is also prevented. If the two control valves 50 are displaced into their open position, in particular by actuation of an electrical actuating element 20 on the drawbar head 16 of the industrial truck, the operating volumes 38 are connected with the pressure accumulator 52. In this case, the hydraulic cylinders 36 can be further extended depending on the operating conditions, wherein hydraulic fluid from the pressure accumulator 52 flows into the operating volumes 38, or further retracted, wherein then the hydraulic fluid from the operating volumes 38 flows into the pressure accumulator 52.

FIG. 5 shows in a perspective view a view transversely from below under a front part of a wheel arm 26. One can see the load roller 30 on the free end of the wheel arm lever 28 and its pivotable mounting around the axis 32 within a recess of the wheel arm tip 54, which is formed by a cast part.

The push rod 34 is arranged within the wheel arm body 58 formed by a U profile and consists of a box profile 56 over a large part of its length. On its front end, the push rod 34 has a push rod tip 60 also made of a cast part, through which a pivot axis (not shown) is passed and articulated on the end of the wheel arm lever 28 removed from the load roller 30.

A sensor 64 is arranged on the front end of the wheel arm body 58 and captures the completely swung-in position of the wheel arm lever 28 shown in FIG. 5 through the resulting approach of the rear end 62 of the wheel arm lever 28, through which the connecting axis between wheel arm lever 28 and push rod tip 60 is passed. A signal generated by the sensor 64 can be forwarded to a controller of the industrial truck via an electrical line.

The invention claimed is:

1. An industrial truck comprising:
 a drive part;
 a load part with two wheel arms that is height-adjustable relative to the drive part, wherein each of the wheel arms comprises,
  a wheel arm lever, which comprises at least one load roller and is pivotably articulated on the wheel arm, and
  a push rod, via which a height adjusting movement of the load part is coupled with a pivoting movement of the wheel arm lever, wherein the push rod comprises a hydraulic cylinder, with which a length of the push rod is adjustable and which has an operating volume,
 a pressure accumulator, which is connectable with the operating volumes of two hydraulic cylinders of the wheel arms; and
 an actuating element arranged on a drawbar of the industrial truck, actuation of which connects the pressure accumulator with the operating volume.

2. The industrial truck of claim 1, wherein the industrial truck further comprises a hydraulic system with a lift cylinder and a hydraulic pump that is completely separated hydraulically from the pressure accumulator and the hydraulic cylinders of the push rods.

3. The industrial truck of claim 1, further comprising a control valve assigned to each of the operating volumes of the hydraulic cylinders, with which the respective operating volumes can be optionally blocked or connected with the pressure accumulator.

4. The industrial truck of claim 3, further comprising a flow-control valve and a bypass valve connected in parallel to the flow-control valve connected between the two control valves on the one hand and the pressure accumulator on the other hand, such that a connection between the operating volumes and the pressure accumulator can be made selectively via the flow-control valve or via the bypass valve.

5. The industrial truck of claim 4, further comprising a sensor adapted to indicate when a medium lift height is reached, and by an electronic control adapted to open the two control valves when an actual lift height falls below the medium lift height during lowering the load part relative to the drive part while the bypass valve is closed.

6. The industrial truck of claim 1, wherein the industrial truck further comprises a lift cylinder, a lower end sensor, which captures a completely lowered position of the lift cylinder, a lift end sensor, which captures a completely raised position of the lift cylinder, and an electronic controller with an operating state memory, which is designed to save whether the industrial truck last executed a ramp lift or an initial lift.

7. The industrial truck of claim 1, further comprising a non-volatile memory in which information on an operating state of the industrial truck is maintained after the industrial truck has been switched off.

8. The industrial truck of claim 1, wherein the hydraulic cylinders have a permissible operating pressure of 200 bar or more.

9. An industrial truck comprising:
a drive part;
a load part with two wheel arms that is height-adjustable relative to the drive part, wherein each of the wheel arms comprises,
    a wheel arm lever, which comprises at least one load roller and is pivotably articulated on the wheel arm, and
    a push rod, via which a height adjusting movement of the load part is coupled with a pivoting movement of the wheel arm lever, wherein the push rod comprises a hydraulic cylinder, with which a length of the push rod is adjustable and which has an operating volume,
a sensor present on one of the wheel arms, which captures a completely swung-in position of the associated wheel arm lever; and
a pressure accumulator, which is connectable with the operating volumes of two hydraulic cylinders of the wheel arms.

10. The industrial truck of claim 9, further comprising a hydraulic system with a lift cylinder and a hydraulic pump that is completely separated hydraulically from the pressure accumulator and the hydraulic cylinders of the push rods.

11. The industrial truck of claim 9, further comprising a control valve assigned to each of the operating volumes of the hydraulic cylinders, with which each respective operating volume can be optionally blocked or connected with the pressure accumulator.

12. The industrial truck of claim 9, further comprising a non-volatile memory in which information on an operating state of the industrial truck is maintained after the industrial truck has been switched off.

13. The industrial truck of claim 9, wherein the hydraulic cylinders have a permissible operating pressure of 200 bar or more.

14. The industrial truck of claim 9, wherein the industrial truck further comprises a lift cylinder, a lower end sensor, which captures a completely lowered position of the lift cylinder, a lift end sensor, which captures a completely raised position of the lift cylinder, and an electronic controller with an operating state memory, which is designed to save whether the industrial truck last executed a ramp lift or an initial lift.

15. A retrofit kit for an industrial truck, which comprises a drive part and a load part with two wheel arms that is height-adjustable relative to the drive part, wherein each of the wheel arms comprises a wheel arm lever, which comprises at least one load roller and is pivotably articulated on the wheel arm, and a push rod, via which a height adjusting movement of the load part is coupled with a pivoting movement of the wheel arm lever, the retrofit kit comprising:
two push rods, each of which comprises a hydraulic cylinder, with which a length of the push rod is adjustable and which has an operating volume,
a pressure accumulator;
a hydraulic connecting device, with which the operating volumes of the hydraulic cylinders are connectable with the pressure accumulator; and
an actuating element for arranging on a drawbar of the industrial truck, actuation of which connects the pressure accumulator with the operating volumes.

16. The retrofit kit of claim 15, wherein the hydraulic connecting device comprises two control valves, with which respectively one of the operating volumes can be optionally blocked or connected with the pressure accumulator.

17. The retrofit kit of claim 15, wherein the hydraulic cylinders have a permissible operating pressure of 200 bar or more.

18. A retrofit kit which comprises a drive part and a load part with two wheel arms that is height-adjustable relative to the drive part, wherein each of the wheel arms comprises a wheel arm lever, which comprises at least one load roller and is pivotably articulated on the wheel arm, and a push rod, via which a height adjusting movement of the load part is coupled with a pivoting movement of the wheel arm lever, the retrofit kit comprising:
two push rods, each of which comprises a hydraulic cylinder, with which a length of the push rod is adjustable and which has an operating volume,
a pressure accumulator;
a hydraulic connecting device, with which the operating volumes of the hydraulic cylinders are connectable with the pressure accumulator;
a sensor for fastening on one of the wheel arms, wherein the sensor captures a completely swung-in position of the associated wheel arm lever.

19. The retrofit kit of claim 18, wherein the hydraulic connecting device comprises two control valves, with which respectively one of the operating volumes can be optionally blocked or connected with the pressure accumulator.

20. The retrofit kit of claim 18, wherein the hydraulic cylinders have a permissible operating pressure of 200 bar or more.

* * * * *

UNITED STATES PATENT AND TRADEMARK OFFICE
CERTIFICATE OF CORRECTION

PATENT NO.        : 9,738,501 B2
APPLICATION NO.   : 14/717507
DATED             : August 22, 2017
INVENTOR(S)       : Wendt et al.

Page 1 of 1

It is certified that error appears in the above-identified patent and that said Letters Patent is hereby corrected as shown below:

On the Title Page

Assignee:
Change spelling of Assignee from Jungheinrich Aktiengesellschadt to -- Jungheinrich Aktiengesellschaft --

Signed and Sealed this
Eighteenth Day of June, 2019

Andrei Iancu
*Director of the United States Patent and Trademark Office*